US010642473B2

(12) United States Patent
Tseng

(10) Patent No.: US 10,642,473 B2
(45) Date of Patent: May 5, 2020

(54) SCROLL-BASED PRESENTATION OF ANIMATION CONTENT

(71) Applicant: Facebook, Inc., Menlo Park, CA (US)

(72) Inventor: Erick Tseng, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/968,488

(22) Filed: May 1, 2018

(65) Prior Publication Data

US 2019/0339852 A1 Nov. 7, 2019

(51) Int. Cl.
*G06F 3/0485* (2013.01)
*G06F 16/74* (2019.01)
*G06F 16/54* (2019.01)
*G06F 3/0484* (2013.01)
*G06T 13/80* (2011.01)

(52) U.S. Cl.
CPC ...... *G06F 3/04855* (2013.01); *G06F 3/04842* (2013.01); *G06F 16/54* (2019.01); *G06F 16/743* (2019.01); *G06T 13/80* (2013.01)

(58) Field of Classification Search
CPC .................................................. G06F 3/04855
USPC ........................................................ 715/786
See application file for complete search history.

(56) References Cited

U.S. PATENT DOCUMENTS

2017/0017616 A1* 1/2017 Elings ................... G06F 17/212
2017/0024098 A1* 1/2017 Doherty ............. G11B 27/3081
2017/0038942 A1* 2/2017 Rosenfeld ........... G06F 3/04815
2017/0300969 A1* 10/2017 Malhotra ........... G06Q 30/0257
2018/0075874 A1* 3/2018 Doherty .............. G06F 3/04812
2018/0130097 A1* 5/2018 Tran .................... G06Q 30/0267
2018/0211692 A1* 7/2018 Doherty ............... G11B 27/036
2019/0132648 A1* 5/2019 Zimmerman ......... G06F 3/0485

OTHER PUBLICATIONS

Hürst, Wolfgang, and Konrad Meier. "Interfaces for timeline-based mobile video browsing." In Proceedings of the 16th ACM international conference on Multimedia, pp. 469-478. 2008. (Year: 2008).*

* cited by examiner

*Primary Examiner* — Frank D Mills
(74) *Attorney, Agent, or Firm* — Fenwick & West LLP

(57) ABSTRACT

An online system or an application of the online system generates and provides user interfaces that include user interface elements configured to allow users to browse newsfeed stories. For example, users can browse newsfeed stories via scrolling actions. The user interface elements are further configured to control presentation of individual stories that include series of images. The user's scrolling action causes the images to be presented sequentially. The online system selects a particular image and configures a speed of presenting the images according to the user action. The online system further generates and provides user interfaces that present still images in a parallax effect by adjusting viewpoints of observing the still images. The viewpoints can be adjusted according to the user action. The online system further configures the user interfaces to present related stories in adjacent positions and to present 360-degree videos as well as panorama images.

16 Claims, 3 Drawing Sheets

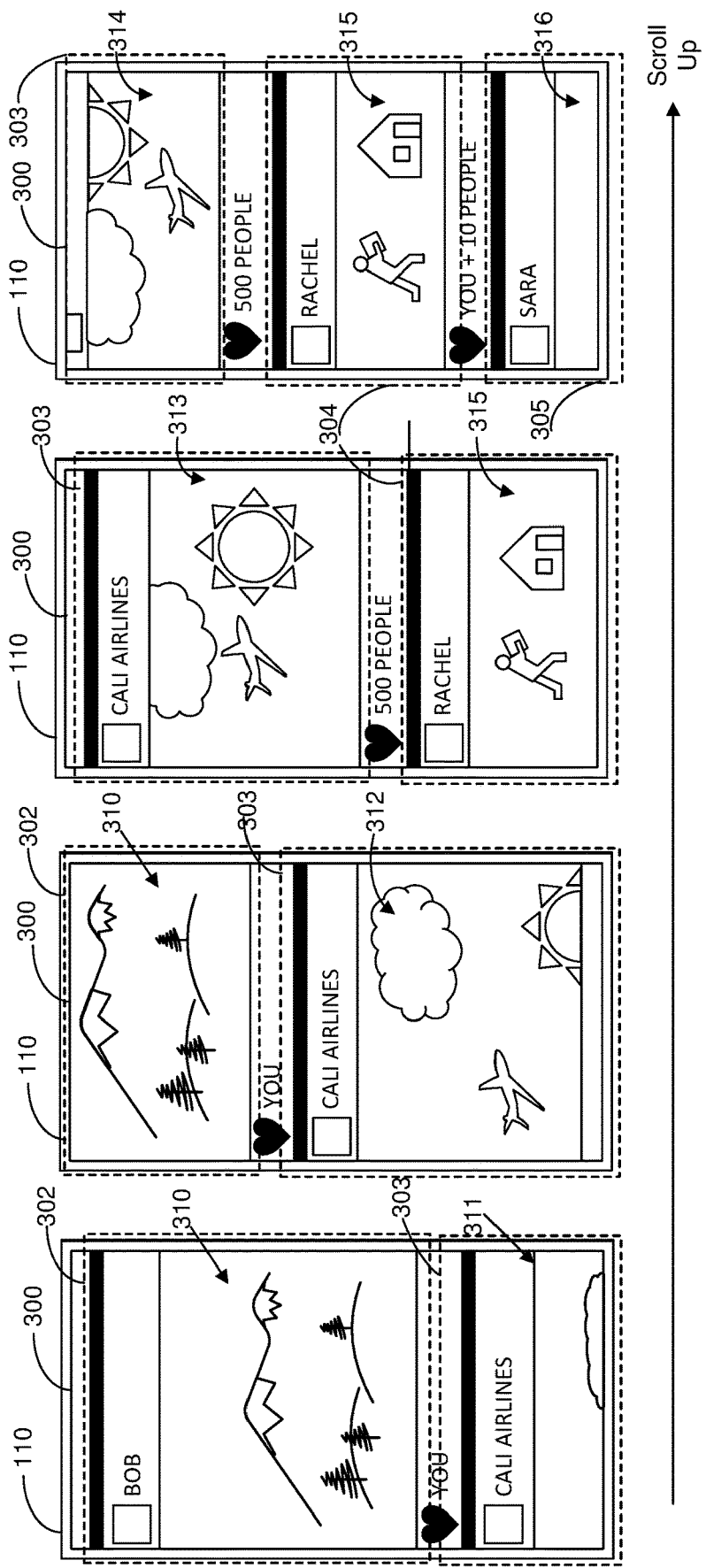

SCROLL-BASED PRESENTATION OF ANIMATION CONTENT

BACKGROUND

This disclosure relates generally to online systems, and more specifically to presenting media content to online system users.

Online systems, such as social networking systems, allow users to connect to and to communicate with other users of the online system. Users may create profiles on an online system that are tied to their identities and include information about the users, such as interests and demographic information. The users may be individuals or entities such as corporations or charities. Online systems allow users to easily communicate and to share content with other online system users by providing content to an online system for presentation to other users. Content provided to an online system by a user may be declarative information provided by a user, status updates, check-ins to locations, images, photographs, videos, text data, or any other information a user wishes to share with additional users of the online system. An online system may also generate content for presentation to a user, such as content describing actions taken by other users on the online system.

More and more users consume content via mobile devices thanks to the ubiquity of mobile devices and advancement in communication technology. In the mobile consumption environment, moving content such as videos are much more powerful in drawing users' attention than static content such as images. Nevertheless, users typically need to actuate video player controls to consume moving media content, which disrupts users' viewing experience. Alternatively, automatically playing videos can be annoying, and users often scroll past or otherwise navigate away from these automatically played videos before they are completed.

SUMMARY

An online system generates and provides user interface for presenting newsfeed stories to users. This unlocks more opportunities for content providers and media creators because users are presented with impressions of their created content in a natural and meaningful way. In addition, the provision of content without additional user actions enhances a user's experience. However, how to present content such as advertisements completely without or with minimal user interruption while still attracting users' attention presents a technical problem. Specifically, what content format is best for presenting moving visual content, how to present moving visual content in different viewing environments in an energy efficient way, how to configure control of presentation of moving content are some example technical problems. The technical solutions presented in the present application include user interfaces that more accurately measure human psychology and interest, translate human psychology and interest into signals and data representation, evaluate a pace for presenting moving media content based on the signals and data representation, and use the evaluation to present media content.

In some embodiments, an online system or an application of the online system generates and provides user interfaces that are configured to allow users to browse newsfeed stories. For example, users can browse newsfeed stories via scrolling actions. The user interface elements are further configured to control presentation of individual stories. For example, an individual story can be an animated story that includes an ordered set of images, and the user's scrolling action causes the images to be presented sequentially in the order. The online system or the application selects a particular image and configures a speed of presenting the images according to the user action. The online system may convert discrete images, videos, or animated pictures that are encoded according to various formats such as graphics interchange format (GIF), flash video format (FLV), and audio video interleave (AVI) into a proprietary format to the online system. The proprietary format allows moving visual content to be played without using additional applications. In the proprietary format, media content items can be played in various browsers or in the application of the online system. The online system or the application further generates and provides user interfaces that present still images in a parallax effect by adjusting viewpoints of observing the still images. The viewpoints can be adjusted according to the user action. The online system or the application further configures the user interfaces to present related stories in adjacent positions and to present 360-degree videos as well as panorama images.

BRIEF DESCRIPTION OF THE DRAWINGS

FIGS. 3A through 3D illustrate an example user interface for presenting slideshow stories, according to one embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
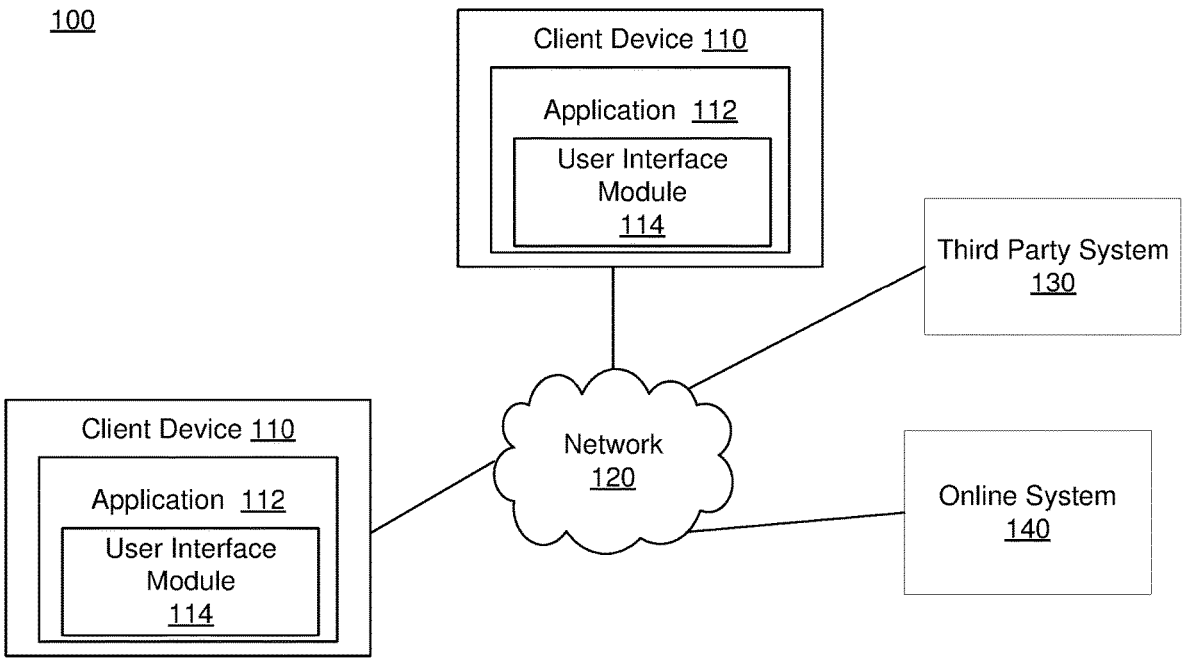
FIG. 1 is a block diagram of a system environment in which an online system operates, in accordance with an embodiment.

FIG. 1 is a block diagram of a system environment 100 for an online system 140.

The system environment 100 shown by FIG. 1 comprises one or more client devices 110, a network 120, one or more third-party systems 130, and the online system 140. In alternative configurations, different and/or additional components may be included in the system environment 100. The embodiments described herein may be adapted to online systems that are social networking systems, content sharing networks, or other systems providing content to users.

The client devices 110 are one or more computing devices capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™. In a further embodiment, as illustrated, a client device 110 includes an application 112 dedicated to interact with the online system 140.

The application 112 receives stories (e.g., a feed of media content items) from the online system 140 and displays the stories to the user. For example, the application 112 receives the feed of media content items from a newsfeed manager (e.g., the newsfeed manager 235 described in connection with FIG. 2). The application 112 includes a user interface module 114 that generates user interfaces for displaying the feed of media content items. The user interfaces are configured to present different stories and adjust relative positions of the stories in response to users' actions such as scrolling. The user interfaces are further configured such that the users' actions can adjust presentation of individual media content items in addition to controlling which media content items to be presented. For example, by scrolling up and down, a user can browse additional stories or revisit stories that were previously presented. In addition, if a particular story includes a series of images, the scrolling up and down controls the presentation of the series of images. As such, an individual can use the same gesture to control the presentation of a particular story and to traverse different stories. The user interfaces can include interface elements include scroll bars, cursors, etc. The user interface module 114 continuously updates the media content items being displayed in the display area as well as the playback of the animated media content item as the user scrolls.

In some embodiments, the user interface is configured to include multiple sections for presenting different stories (i.e., media content items). A section is configured to present one media content item such as an image, a video, or a series of images. The series of images can be an ordered set of images. The user interface module 114 configures a dimension of a section according to a dimension of the story for presentation via the section. The section, if entirely visible, presents the story in its entirety or a thumbnail of the story. The user interface module 114 determines a visible portion of the section according to a relative position of the section. For example, the scrolling user action can move the section such that a portion of the section is outside of the display area of the client device and becomes invisible. The remaining portion of the section remains visible. The user interface module 114 selects a portion of the media content item for presentation via the visible portion of the section. The selection can be proportional to the visible portion of the section.

The user interface is configured to allow users to adjust a relative position of a section and to control a visible portion of the section. For example, the relative position of the section as well as a visible portion of the section is adjusted by gestures such as dragging a scrollbar, one-finger swiping up and down, one-finger swiping left and right, two-finger swiping up and down, two-finger swiping left and right, hand waving up and down, hand waving left and right, etc. To achieve the adjustment and control, users can also actuate native hardware interface elements of the client devices 110 such as touchscreens, arrow keys, page-up keys, page-down keys, space bars, touchpads, and the like.

The user interface module 114 configures a section such that the playback of the media content item is adjusted according to a relative position of the section. The relative position of the section is the section's position relative to a fixed location on the display area of the client device 110. The fixed location is a reference point for determining the relative position of the section such as the top right corner, the top left corner, the top edge, the bottom edge, the bottom right corner, the bottom left corner, the left edge, the right edge, and the like. The media content item includes a series of images that illustrate moving visual content. The user interface module 114 selects a particular image from the series of images for presentation via the section. The selection is based at least on a relative position of the section. For example, the user interface module 114 compares the relative position of the section to position ranges, and selects the particular image if the section is located in a particular position range. The position ranges can be determined according to a number of images included in the series of images and a dimension of the display area of the client device 110. An image is presented for at least a threshold amount of time. The selection can be further based on a speed of the user's gesture. For example, if the speed of the user's gesture is above a threshold speed for presenting the series of images, the user interface module 114 selects to present a subset of the series of images.

The user's traverse gesture can therefore adjust a position of a section as well as the content being displayed in the section. The playback speed is also adjusted according to an attribute of the user's gesture, such as the speed, pressure, direction, or other attributes. For example, a faster gesture triggers the playback of an animated media content item at a higher speed than a slower gesture. The user interface module 114 can determine a speed of the user's gesture and calculate a playback speed based on the speed of the user's gesture. For example, based on the speed, the user interface module 114 determines an amount of time the section being visible because the display area is known. Based on the amount of time the section being visible, the user interface module 114 determines an amount of time an image being visible. The user interface is configured such that the playback of the animated media content item is completed during the time interval that the section appears. In other embodiments, a section can be configured to include a native video player to playback videos and/or series of images. A user can adjust the playback of the videos and/or series of images by controlling the native video player.

In some embodiments, the user interface is further configured such that a user's gesture to traverse media content items adjusts a viewpoint of an image being displayed in a section. For example, if a user scrolls up to browse additional stories, the user interface module 114 adjusts the presentation of the still image in addition to presenting additional stories. The presentation of the still image is adjusted as if a viewpoint is changing in response to the user's scrolling up action. For example, the background object and the foreground object move at different speeds in response to the user's scrolling up action. As such, the user is provided with a parallax experience of viewing the still image.

The media content items include 360-degree videos and panorama images. The user interface module 114 further configures the user interface such that a section, if triggered by a predetermined gesture (e.g., clicking on), presents the 360-degree videos and panorama images. The user interface is configured to allow users to pan around the 360-degree videos and panorama images by clicking and dragging, waving hands, adjusting the orientation of the client device, and other gestures.

The user interface module 114 further configures the user interface to present related media content items in different sections. Related media content items have related media content, such as having the same topic, the same story line, the same theme, and the like. The user interface is configured to present related media content items in adjacent sections or consecutive sections for presenting sponsored media content items. The consecutive sections for presenting sponsored media content items may be separated by one or more sections for presenting organic media content items. By doing this, multiple media content items can be presented to a user across different sections for presenting a story.

The user interface module 114 may limit the number of videos or images included in a slideshow to be less than a predetermined number thereby to prevent digital motion sickness. Example user interfaces are further described in connection with FIGS. 3A through 4B.

The client devices 110 may include execute client software, e.g., a web browser or built-in client application, to interact with the parallel database system 100 via a network. Note that the terms "client" or "client device," as used herein may refer to software providing respective functionality, to hardware on which the software executes, or to the entities operating the software and/or hardware, as is apparent from the context in which the terms are used. For example, a client device 110 may execute business intelligence software or analytic tools that send interact with a database system.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3 G, 4 G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. Example third party systems 130 include sponsored content provider systems, publisher systems, application developer systems, and the like. For example, a third party system 130 provides content or other information for presentation via a client device 110. A third party system 130 may also communicate information to the online system 140, such as advertisements, content, or information about an application provided by the third party website 130. Specifically, in one embodiment, a third party system 130 communicates sponsored content, such as advertisements, to the online system 140 for display to users of the client devices 110. The sponsored content may be created by the entity that owns the third party system 130. Such an entity may be an advertiser or a company producing a product, service, message, or something else that the company wishes to promote.

Figure 2:
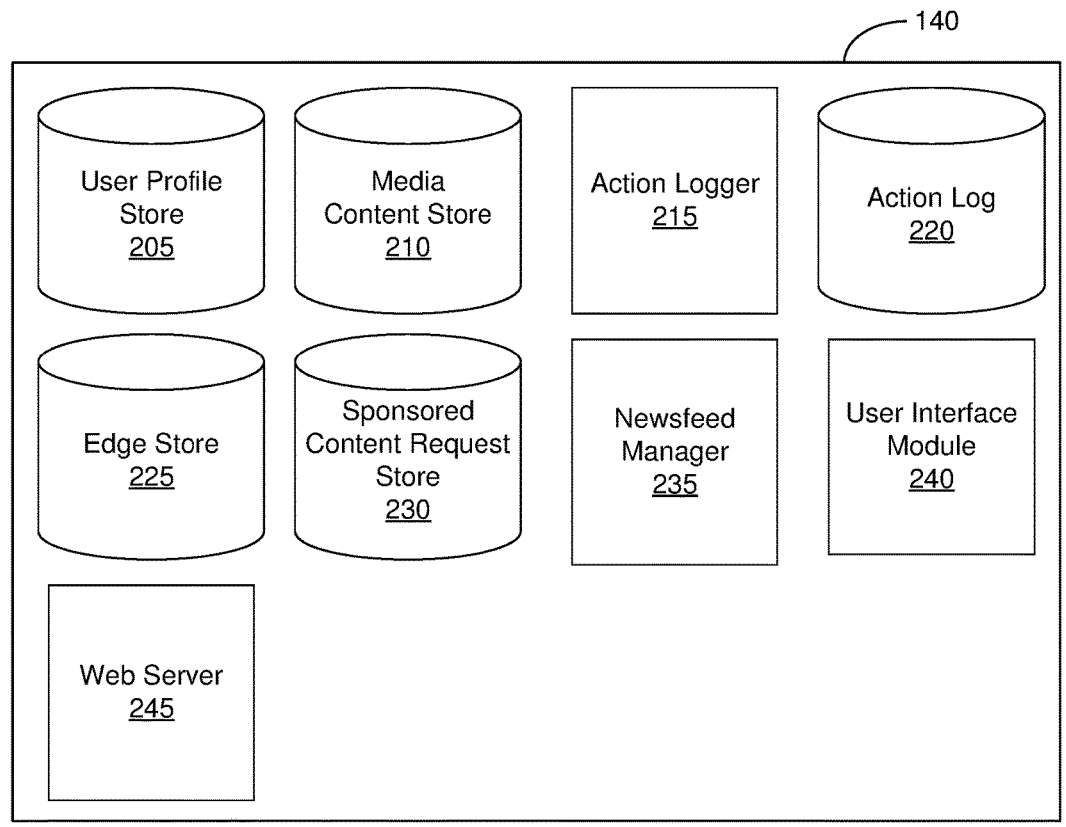
FIG. 2 is a block diagram of an online system, in accordance with an embodiment.

FIG. 2 is a block diagram of an architecture of the online system 140. The online system 140 shown in FIG. 2 includes a user profile store 205, a media content store 210, an action logger 215, an action log 220, an edge store 225, a sponsored content request store 230, a newsfeed manager 235, a user interface module 240, and a web server 245. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding user of the online system 140. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the online system 140 displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The media content store 210 stores objects that represent various types of content. Examples of content represented by an object include a page post, a status update, a photograph, a video, a link, a shared content item, a gaming application achievement, a check-in event at a local business, a brand page, an article (e.g., an instant article, an interactive article) a search result, or any other type of content. In one embodiment, objects in the content store 210 represent single pieces of content, or content "items." Users of the online system 140 are encouraged to communicate with each other by posting text and content items of various types of media to the online system 140 through various communication channels. This increases the amount of interaction of users with each other and increases the frequency with which users interact within the online system 140. Media content items stored in the media content store 210 are referred herein after as "organic media content items." An organic media content item is generated based on user actions.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), engaging in a transaction, viewing an object (e.g., a content item), and sharing an object (e.g., a content item) with another user. Additionally, the action log 220 may record a user's interactions with sponsored content items as well as with other applications operating on the online system 140. In some embodiments, data from the action log 220 is used to infer interests or preferences of a user, augmenting the interests included in the user's user profile and allowing a more complete understanding of user preferences.

The action log 220 may be used by the online system 140 to track user actions on the online system 140, as well as actions on third party systems 130 that communicate information to the online system 140. Users may interact with various objects on the online system 140, and information describing these interactions are stored in the action log 220. Examples of interactions with objects include: commenting on posts, sharing links, and checking-in to physical locations via a mobile device, accessing content items, and any other interactions. Additional examples of interactions with objects on the online system 140 that are included in the action log 220 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log 220 may record a user's interactions with sponsored content items as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website that primarily sells sporting equipment at bargain prices may recognize a user of an online system 140 through a social plug-in enabling the e-commerce website to identify the user of the online system 140. Because users of the online system 140 are uniquely identifiable, e-commerce websites, such as this sporting equipment retailer, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or a particular user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more sponsored content requests are stored in the sponsored content request store 230. A sponsored content request includes sponsored content and a bid amount. In one embodiment, a sponsored content is an advertisement (also referred to as an "ad"). The sponsored content requests stored in the sponsored content request store 230 include sponsored content campaigns. A sponsored content campaign is associated with a set of delivery parameters (e.g., a budget, impression goal, a target average price paid, etc.)

A sponsored content campaign includes one or more sponsored content items for presentation to one or more online system users. A sponsored content item includes sponsored content such as text, image, audio, video, or any other suitable data presented to a user. In various embodiments, the sponsored content is associated with a network address specifying a landing page, or other destination, to which a user is directed when the sponsored content item is accessed. A bid amount is also associated with each sponsored content item and represents or is related to an amount of compensation, such as monetary compensation, a sponsored content provider associated with the sponsored content request provides the online system 140 in exchange for presentation of the sponsored content item. For sponsored content items that compensate the online system 140 based on actions performed by a user who receives the ad, the bid amount may be a conversion of the payment per-action to an expected value for providing a sponsored content item impression. An expected value to the online system 140 of presenting a sponsored content item may be determined based on the bid amount associated with a corresponding sponsored content item request or based on the bid amount and a likelihood of a user interacting with the sponsored content item if it is presented to the user. Examples of actions associated with a bid amount include presenting a sponsored content item to a user, receiving a user interaction with the sponsored content item, receiving a user interaction with an object associated with the sponsored content item, or any other suitable condition.

Additionally, for a particular sponsored content item, the sponsored content campaign may include one or more targeting criteria specified by the sponsored content provider. Targeting criteria included in a sponsored content request specify one or more characteristics of users eligible to be presented with the sponsored content. For example, targeting criteria are used to identify users having user profile information, edges, or actions satisfying at least one of the targeting criteria. Hence, targeting criteria allow a sponsored content provider to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users who have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows advertisers to further refine users eligible to be presented with sponsored content from a sponsored content request. As another example, targeting criteria identifies users having a connection to another user or object or having a particular type of connection to another user or object.

In one embodiment, the online system 140 identifies stories likely to be of interest to a user for a "newsfeed" presented to the user. A story presented to a user can be an organic media content item that describes any type of content item, such as text, images, and/or videos that may be of interest to a viewer. In a social networking context, the story may contain information about an action taken by an additional user connected to the user and identifies the additional user, or other forms such as postings by a page associated with a business, entity, or person the user is following, among other story types. The story can also be a sponsored content item, such as an advertisement. In some embodiments, a story describing an action performed by a user may be accessible to users not connected to the user that performed the action.

The newsfeed manager 235 may generate stories for presentation to a user based on information in the action log 220 and in the edge store 225 or may select candidate stories included in content store 210. One or more of the candidate stories are selected and presented to a user by the newsfeed manager 235. A story can be a sponsored media content item selected from the sponsored content request store 230 or an organic media content item selected from the media content store 210.

For example, the newsfeed manager 235 receives a request to present one or more stories to a social networking system user. The newsfeed manager 235 accesses one or more of the user profile store 205, the media content store 210, the action log 220, the edge store 225, to retrieve information about the identified user. For example, stories or other data associated with users connected to the identified user are retrieved. The retrieved stories or other data is analyzed by the newsfeed manager 235 to identify content likely to be relevant to the identified user. For example, stories associated with users or pages not connected to the identified user or stories associated with users or pages for which the identified user has less than a threshold affinity are discarded as candidate stories. Based on various criteria, the newsfeed manager 235 selects one or more of the candidate stories for presentation to the identified user.

The newsfeed manager 235 determines candidate sponsored content items in response to a request for sponsored content. The request for sponsored content is associated with a user viewing the host content. One or more sponsored content items are selected from the candidate sponsored content items to fulfill the request for sponsored content. The newsfeed manager 235 accesses one or more of the sponsored content request store 230, the user profile store 205, the action log 220, and the edge store 225 to retrieve information about the sponsored content item campaigns and the users.

When determining eligible sponsored content items, the newsfeed manager 235 further determines whether the user satisfies targeting criteria associated with the sponsored content items. That is, eligible content items are associated with host criteria satisfied by the host content associated with the request for sponsored content and targeting criteria satisfied by the user viewing the host content. The newsfeed manager 235 may access one or more of the user profile store 205, the action log 220, and the edge store 225 to retrieve information about the user and use the retrieved information to make the determination.

The newsfeed manager 235 selects one or more sponsored content items from the eligible sponsored content items to fulfill the request for sponsored content. The selection can be based at least on bid amounts associated with the candidate sponsored content items. For example, the newsfeed manager 235 selects the eligible content item having the highest bid amount for presentation to the user.

The newsfeed manager 235 may determine an expected value for each identified eligible sponsored content item and selects the eligible sponsored content item that has a maximum expected value for presentation to the user. Alternatively, the newsfeed manager 235 selects eligible sponsored content items that are associated with at least a threshold expected value. An expected value represents an expected amount of compensation to the online system 140 for presenting a sponsored content item. For example, for a particular sponsored content item, the expected value associated is a product of the bid amount and a likelihood of the user interacting with the sponsored content item. The newsfeed manager 235 may rank sponsored content items based on their associated bid amounts and select sponsored content items having at least a threshold position in the ranking for presentation to the user. In some embodiments, the newsfeed manager 235 ranks eligible sponsored content items and media content items stored in the media content store 210 in a unified ranking and selects media content for presentation based on the ranking. Selecting media content through a unified ranking is further described in U.S. patent application Ser. No. 13/545,266, filed on Jul. 10, 2012, which is hereby incorporated by reference in its entirety.

In various embodiments, the newsfeed manager 235 presents stories to a user through a newsfeed, which includes a plurality of stories selected for presentation to the user. The newsfeed may include a limited number of stories or may include a complete set of candidate stories. The number of stories included in a newsfeed may be determined in part by a user preference included in the user profile store 205. The newsfeed manager 235 may also determine the order in which selected stories are presented via the newsfeed. For example, the newsfeed manager 235 determines that a user has a highest affinity for a specific user and increases the number of stories in the newsfeed associated with the specific user or modifies the positions in the newsfeed where stories associated with the specific user are presented.

The newsfeed manager 235 presents the selected media content item (e.g., a sponsored content item, an organic media content item) for presentation to a user. The newsfeed manager 235 may also determine an order in which selected sponsored content items are presented. For example, the newsfeed manager 235 orders the sponsored content items based on likelihoods of the user interacting with them and presents the sponsored content items in the order. For example, the newsfeed manager 235 includes the highest ranked sponsored content item at the most prominent position.

In some embodiments, the newsfeed manager 235 processes media content items such as videos, series of images, or multiple discrete images into a slideshow format. A slideshow includes a number of video frames or images arranged into an order.

The user interface module 240 generates and provides user interfaces for presenting stories (i.e., media content items) to users. The user interfaces are provided to client devices that interfaces with the online system 140 without using the application 112. Similar to the user interface module 114 described in connection with FIG. 1, the user interface module 240 generates user interfaces that include user interface elements, if actuated, control which stories are presented to the users and control relative positions of the stories that are presented. The user interface module 240 is similar to the user interface module 114 and description is omitted herein.

The web server 245 links the online system 140 via the network 120 to the one or more client devices 110, as well as to the one or more third party systems 130. The web server 245 serves web pages, as well as other content, such as JAVA®, FLASH®, XML and so forth. The web server 245 may receive and route messages between the online system 140 and the client device 110, for example, instant messages, queued messages (e.g., email), text messages, short message service (SMS) messages, or messages sent using any other suitable messaging technique. A user may send a request to the web server 245 to upload information (e.g., images or videos) that are stored in the media content store 210. Additionally, the web server 245 may provide application programming interface (API) functionality to send data directly to native client device operating systems, such as IOS®, ANDROID™, WEBOS® or BlackberryOS.

Example User Interfaces

FIGS. 3A through 3D illustrate an example user interface for presenting slideshow stories, according to one embodiment. The user interface 300 is generated by the user interface module 114 or is provided from the online system 140 to the client device 110. The user interface 300 presents a series of stories when a user scrolls up. The user scrolls up to browse additional stories in the newsfeed that are not visible on the display area of the client device 110. In the illustrated example, the client device 110 is a mobile device that has a touch screen. The user scrolls up by swiping up and down to browse additional stories. The user interface 300 includes multiple sections 302 through 305 for presenting four different stories (i.e., media content items) 310-316, respectively. The user interface module 114 is used as an example to describe the configuration of the user interface 300 hereinafter.

As illustrated in FIG. 3A, the client device 110 presents the user interface 300. Specifically, the sections 302 and 303 are visible to the user. The section 302 presents a story by the user Bob, which is a still landscape image 310. A dimension of the section 302 is configured according to a dimension of the image 310. The section 303 presents a commercial by an advertiser Cali Airlines, which is an animation commercial that includes a series of images 311 through 314. The series of images 311 through 314 present a dynamic story. Compared to static stories, dynamic stories are more expressive and are more effective in drawing users' attention. In the illustrated example, a portion of the image 311 is presented in the visible portion of the section 303.

As the user scrolls down, the user interface 300 is adjusted such that both relative positions of the section 302 and the section 303 move up in the display area of the client device 110. As a result of the user's scrolling down, a visible portion of the section 302 decreases and a visible portion of the section 303 increases compared to that as illustrated in FIG. 3A. A portion of the still image 310 is displayed in the visible portion of the section 302. The image 312 in its entirety is displayed in the section 303.

As the user continues to scroll down, the user interface 300 is adjusted such that the section 301 becomes invisible, the relative position of the section 303 moves up, and the section 304 becomes visible, as illustrated in FIG. 3C. The section 304 presents the still image 315 by the user Rachel. The image 313 in its entirety is displayed in the section 303.

As the user continues to scroll down, as illustrated in FIG. 3D, the user interface 300 is adjusted such that the relative position of the section 303 moves up and the visible portion of the section 303 decreases compared to that as illustrated in FIG. 3C. In addition, the relative position of the section 304 moves up, and the section 305 becomes visible.

The images 311 through 314 are different and together present a moving media content, i.e., a plane taking off. As illustrated, relative positions of the different objects (e.g., the cloud, the plane, and the sun) change across the images 311 through 314. This change of relative positions of the objects create a moving effect. The user interface 300 is configured to present different images 311 through 314 according to a relative position of the section 303. For example, the image 312 is selected according to a position of the section 303 illustrated in FIG. 3B, and the image 313 is selected according to a position of the section 303 illustrated in FIG. 3C. The user interface module 114 compares a relative position of the section to a series of position ranges and selects a particular frame based on the comparison. The position ranges can be determined according to a number of images included in the series of images. In the illustrated example, the series of images includes only four images, the user interface module 114 selects the image 311 if the relative position of the section 303 is below 25% of the display area, selects the image 312 if the relative position of the section 303 is within 25-50% of the display area, selects the image 313 if the relative position of the section 303 is within 50-75% of the display area, and selects the image 314 if the relative position of the section 303 is within 75-100% of the display area. The relative position of a section can be measured as a distance from a top edge of the section to a top edge of the display area.

In some embodiments, the images 311 through 314 are selected from a series of images according to a speed of the user adjusting the position of the section 303 in addition to a relative position of the section. Depending on the speed, a subset or all of the series of images are presented. If a scrolling speed is too fast, by presenting a subset of the series of images rather than the entire series of images can prevent digital motion sickness. Each image is presented to a user for at least a minimum time interval. For example, the user interface module 114 measures a scrolling speed, and calculates an amount of time the section being visible. Based on the calculated amount of time the section being visible, the user interface module 114 determines a maximum number of images presented in the amount of time that does not cause digital motion sickness. If the number of images included in the series of images exceeds the maximum number, the user interface module 114 selects a subset of the series of images for presentation to the user. For example, the user interface module 114 selects every other video frame as the subset for presentation. As another example, the user interface module 114 selects representative images for presentation to the user such that a total number of images for presentation to the user does not exceed the maximum number of images. The user interface module 114 compares image content of consecutive frames, identifies consecutive frames of which the image content is similar, and selects one frame from the consecutive frames as the representative frame for presentation to the user.

The user interface module 114 configures a dimension of a section according to a dimension of the media content item to be presented in the section. The user interface module 114 further selects a portion of a media content item for presentation in a visible portion of a section. For example, if a lower 40% of the section is visible, the lower 40% of the media content item is shown in the section. As another example, the user interface module 114 selects to present a featured portion of the media content item in the visible section. The featured portion is the portion of the media content on which users focus.

Figure 4A:
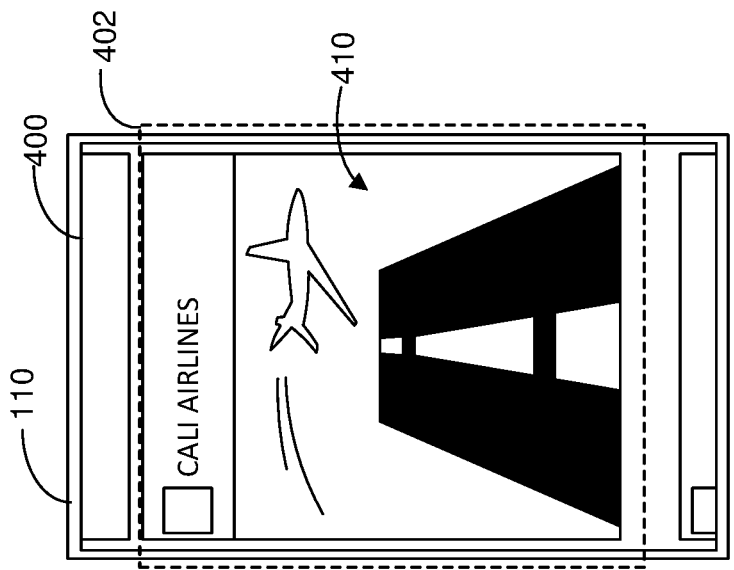
FIGS. 4A through 4B illustrate an example user interface for presenting a parallax effect by adjusting viewpoints, according to one embodiment.
Figure 4B:
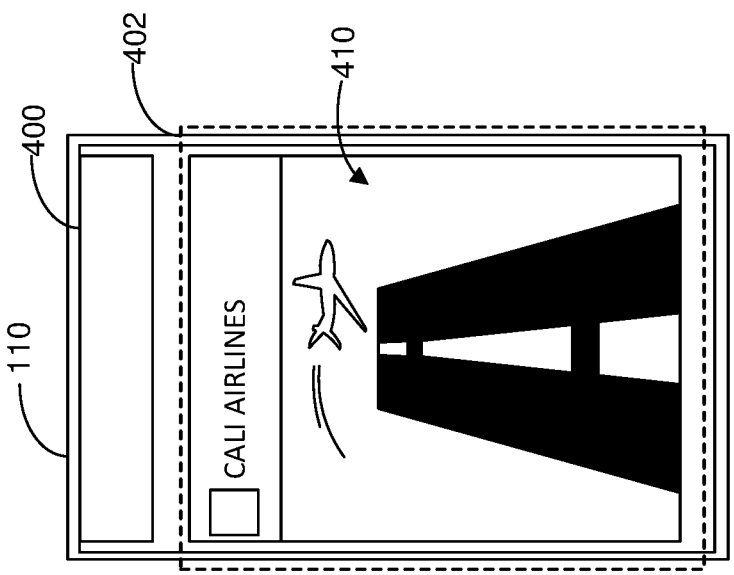

FIGS. 4A through 4B illustrate an example user interface for presenting a parallax effect by adjusting viewpoints, according to one embodiment. The user interface 400 includes a section 402 for presenting a still image 410. As the user scrolls down, the relative position of the section 402 moves up. Configuration and control of the section 402 is similar to configuration and control of the sections 302 through 305 described in connection with FIGS. 3A through 3D. In addition, the section 402 is configured such that a viewpoint is adjusted in response to a user's scrolling motion thereby to provide a parallax effect. As illustrated, the viewpoint is adjusted as if the user is approaching the runway. The adjustment of the viewpoint is achieved by presenting different portions of the still image as well as the dimensions of the different portions. For example, the user interface module 114 adjusts the portion of the image being displayed in the section 402 according to a relative position of the section 402 on the display area of the client device 110. For example, the user interface module 114 compares the relative position of the section 402 to position ranges, and modifies the image 410 for display via the section 402 based on the comparison. As one example, if the relative position of the section 402 is in the 25-50% of the display area, the user interface module 114 modifies the image 410 by masking the image 410 and enlarging unmasked objects in the foreground by 25% and enlarging unmasked objects in the background by 50%. The viewpoint can be further adjusted according to a scrolling speed. For example, based on the scrolling speed, the user interface module 114 determines an amount of time each image is presented, an amount of time transitioning from one image to another image, an amount of modification between two consecutive images, and other factors related to adjusting the viewpoint.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving, from an online system by a client device including a display area, a feed of media content items, wherein a media content item of the feed of media content items is an animated content item that includes an ordered set of images illustrating moving visual content;
   displaying, by the client device, a subset of media content items of the feed of media content items in the display area;
   receiving, at the client device, a user input signal to scroll the feed of media content items;
   in response to the user input signal:
      scrolling the feed on the display area of the client device, wherein a different subset of media content items of the feed of media content items is displayed in the display area and the different subset of media content items includes the animated content item;
      playing the animated media content item by:
         determining a position of the section on the display area,
         calculating a scrolling speed,
         calculating an amount of time for displaying the section on the display area based on the position of the section on the display area and the scrolling speed,
         determining a maximum number of images for display based on the calculated amount of time, and
         responsive to determining the scrolling speed exceeds a threshold speed and the ordered set of images exceeds the maximum number of images, selecting a subset of the ordered set of images to play based on the position of the section, the scrolling speed, and the maximum number of images; and
      updating the subset of the media content items displayed in the display area and the selection of the subset of the ordered set of images to be played as the scrolling progresses.

2. The method of claim 1, wherein each image of the subset of the ordered set of images is displayed for at least a threshold amount of time.

3. The method of claim 1, wherein selecting the subset of the ordered set of images comprises:
   calculating the scrolling speed; and
   determining an amount of time for displaying each image of the subset of the ordered set of images based on the scrolling speed,
   wherein each image is displayed for the amount of time.

4. The method of claim 1, wherein the ordered set of images includes one image, and wherein selecting the subset of the ordered set of images comprises:
   comparing the position of the section to position ranges; and
   responsive to determining the position of the section is within a position range, modifying the subset of the ordered set of images according to a viewpoint corresponding to the position range,
   wherein the modified subset of the ordered set of images is displayed in the display area.

5. The method of claim 1, wherein the feed of media content items includes a second media content item including a second ordered set of images illustrating second moving visual content, further comprising:
   in response to the user input signal:
      updating the subset of media content items to include the second media content item including the second ordered set of images; and
      displaying the second media content item in a second section configured to present media content, the second section adjacent to the first section on the display area.

6. The method of claim 5, wherein each of the media content items is an organic media content item generated by the online system or a sponsored media content item received from a third party system, the first media content item and the second media content item are sponsored media content items, and the first section and the second section are separated by one or more sections displaying organic media content items.

7. The method of claim 1, wherein the subset of media content items includes a 360-degree video or a panorama image, further comprising:
   receiving a second user input signal to view the 360-degree video or the panorama image;
   in response to the second user input signal: presenting the 360-degree video or the panorama image.

8. The method of claim 1, wherein the media content item is of a format further comprising:
   receiving, by the online system, a series of images or a video including a series of video frames; and
   processing the series of images or the video into the ordered set of images.

9. A computer program product comprising a non-transitory computer readable storage medium having instructions encoded thereon that, when executed by a processor, cause the processor to:
   update, from an online system by a client device including a display area, a feed of media content items, wherein a media content item of the feed of media content items is an animated content item that includes an ordered set of images illustrating moving visual content;
   display, by the client device, a subset of media content items of the feed of media content items in the display area;

receive, at the client device, a user input signal to scroll the feed of media content items;
in response to the user input signal:
scroll the feed on the display area of the client device, wherein a different subset of media content items of the feed of media content items is displayed in the display area and the different subset of media content items includes the animated content item;
play the animated media content item by:
determining a position of the section on the display area,
calculating a scrolling speed,
calculating an amount of time for displaying the section on the display area based on the position of the section on the display area and the scrolling speed,
determining a maximum number of images for display based on the calculated amount of time, and
responsive to determining the scrolling speed exceeds a threshold speed and the ordered set of images exceeds the maximum number of images, selecting a subset of the ordered set of images to play based at least on the position of the section, the scrolling speed, and the maximum number of images; and
update the subset of the media content items displayed in the display area and the selection of the subset of the ordered set of images to be played as the scrolling progresses.

10. The computer program product of claim 9, wherein the instructions are configured to cause the processor to display each image of the subset of the ordered set of images for at least a threshold amount of time.

11. The computer program product of claim 9, wherein the instructions configured to cause the processor to select the subset of the ordered set of images are further configured to cause the processor to:
calculate the scrolling speed; and
determine an amount of time for displaying each image of the subset of the ordered set of images based on the scrolling speed,
wherein each image is displayed for the amount of time.

12. The computer program product of claim 9, wherein the ordered set of images includes one image, and wherein the instructions configured to cause the processor to select the subset of the ordered set of images are further configured to cause the processor to:
compare the position of the section to position ranges; and
responsive to determining the position of the section is within a position range, modify the subset of the ordered set of images according to a viewpoint corresponding to the position range,
wherein the modified subset of the ordered set of images is displayed in the display area.

13. The computer program product of claim 9, wherein the feed of media content items includes a second media content item including a second ordered set of images illustrating second moving visual content, wherein the instructions are configured to cause the processor to:
in response to the user input signal:
update the subset of media content items to include the second media content item including the second ordered set of images; and
display the second media content item in a second section configured to present media content, the second section adjacent to the first section on the display area.

14. The computer program product of claim 13, wherein each of the media content items is an organic media content item generated by the online system or a sponsored media content item received from a third party system, the first media content item and the second media content item are sponsored media content items, and the first section and the second section are separated by one or more sections displaying organic media content items.

15. The computer program product of claim 9, wherein the subset of media content items includes a 360-degree video or a panorama image, wherein the instructions are configured to cause the processor to:
receive a second user input signal to view the 360-degree video or the panorama image;
in response to the second user input signal: present the 360-degree video or the panorama image.

16. A system comprising:
a processor; and
memory storing instructions configured to cause the processor to:
receive, from an online system by a client device including a display area, a feed of media content items, wherein a media content item of the feed of media content items is an animated content item that includes an ordered set of images illustrating moving visual content;
display, by the client device, a subset of media content items of the feed of media content items in the display area;
receive, at the client device, a user input signal to scroll the feed of media content items;
in response to the user input signal:
scroll the feed on the display area of the client device, wherein a different subset of media content items of the feed of media content items is displayed in the display area and the different subset of media content items includes the animated content item;
play the animated media content item by:
determining a position of the section on the display area,
calculating a scrolling speed,
calculating an amount of time for displaying the section on the display area based on the position of the section on the display area and the scrolling speed,
determining a maximum number of images for display based on the calculated amount of time, and
responsive to determining the scrolling speed exceeds a threshold speed and the ordered set of images exceeds the maximum number of images, selecting a subset of the ordered set of images to play based on the position of the section, the scrolling speed, and the maximum number of images; and
update the subset of the media content items displayed in the display area and the selection of the subset of the ordered set of images to be played as the scrolling progresses.

* * * * *